United States Patent
Mills

(10) Patent No.: US 6,811,191 B2
(45) Date of Patent: Nov. 2, 2004

(54) COUPLING ASSEMBLY FOR CONNECTING CORRUGATED CONDUIT

(76) Inventor: Mark S. Mills, 5051 Iroquois Ave., Erie, PA (US) 16511

(*) Notice: Subject to any disclaimer, the term of this patent is extended or adjusted under 35 U.S.C. 154(b) by 0 days.

(21) Appl. No.: 10/260,962

(22) Filed: Oct. 1, 2002

(65) Prior Publication Data

US 2004/0061335 A1 Apr. 1, 2004

(51) Int. Cl.[7] .................................................. F16L 21/00
(52) U.S. Cl. ........................ 285/409; 903/398; 903/371
(58) Field of Search ................................ 285/903, 408, 285/409, 365, 111, 398, 371

(56) References Cited

U.S. PATENT DOCUMENTS

| | | | | |
|---|---|---|---|---|
| 167,262 A | * | 8/1875 | Lewis | ........................ 285/398 |
| 740,664 A | * | 10/1903 | Kroll | ........................... 285/409 |
| 936,627 A | * | 10/1909 | Hill | ............................. 285/398 |
| 2,725,246 A | * | 11/1955 | Weinhold | ................... 285/371 |
| 3,806,169 A | * | 4/1974 | Roadfeldt | .................... 285/903 |
| 4,168,091 A | | 9/1979 | Boomgarden et al. | |
| 4,519,637 A | * | 5/1985 | Folkers | ........................ 285/398 |
| 4,573,715 A | * | 3/1986 | Armbruster | ................. 285/903 |
| 4,795,197 A | | 1/1989 | Kaminski et al. | |
| 4,871,198 A | | 10/1989 | Hattori et al. | |
| 5,015,013 A | * | 5/1991 | Nadin | ......................... 285/903 |
| 5,072,972 A | | 12/1991 | Justice | |
| 5,082,028 A | * | 1/1992 | Leonard | ..................... 285/903 |
| 5,277,459 A | * | 1/1994 | Braun et al. | ................. 285/903 |
| 5,707,088 A | | 1/1998 | Miller et al. | |
| 5,862,581 A | | 1/1999 | Miller et al. | |
| 6,398,270 B1 | | 6/2002 | Fukui et al. | |

OTHER PUBLICATIONS

Hi–Vac vacuum cleaners and conveyors brochure.

* cited by examiner

Primary Examiner—David Bochna
(74) Attorney, Agent, or Firm—Richard K Thomson

(57) ABSTRACT

A quick locking and unlocking coupling for connecting lengths of flexible, corrugated conduit in end to end registration, or for attaching conduit to an outlet, feeder or source of, for example, industrial, high volume vacuuming equipment, includes a cylindrical conduit joining member having half sections that are insertable within the ends of the conduit lengths for aligning and supporting the conduit ends thereby establishing fluid, gas or material flow communication through the lengths of conduit. An annular center flange projects from the conduit joining member providing an abutment surface for the respective conduit ends, and a pair of pivotally joined arcuate arms are mounted to the flange and are movable from an unlocked position to a locked position encompassing the flange and the ends of the conduit thereby locking the coupling to the conduit ends and interconnecting the conduit lengths thus providing gas, fluid or material flow therethrough.

10 Claims, 3 Drawing Sheets

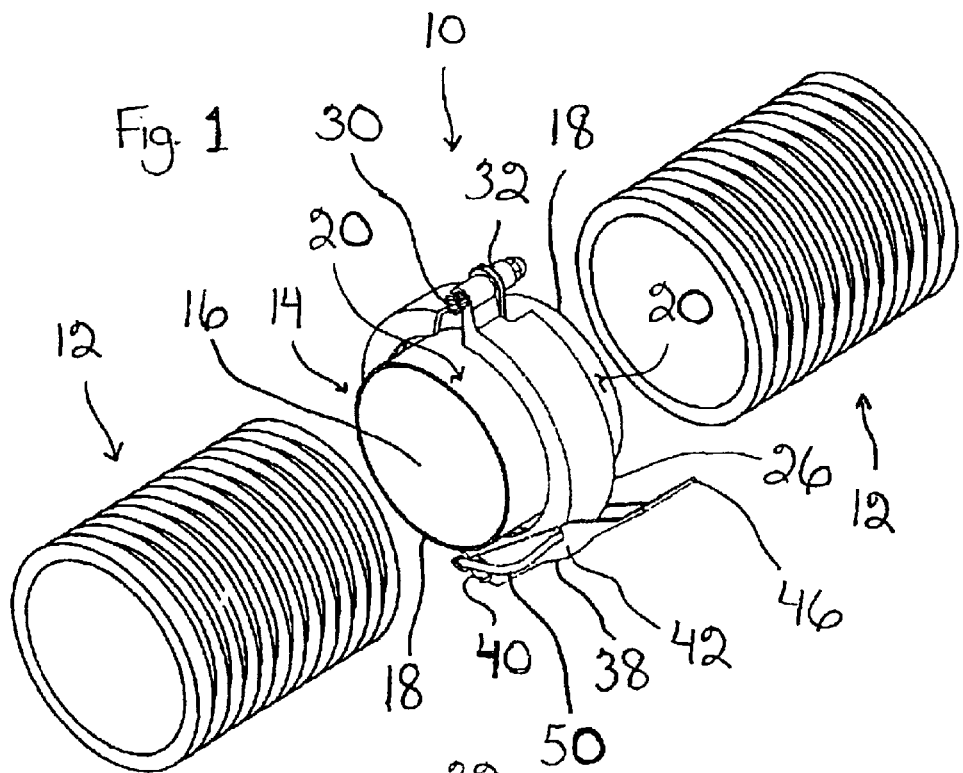
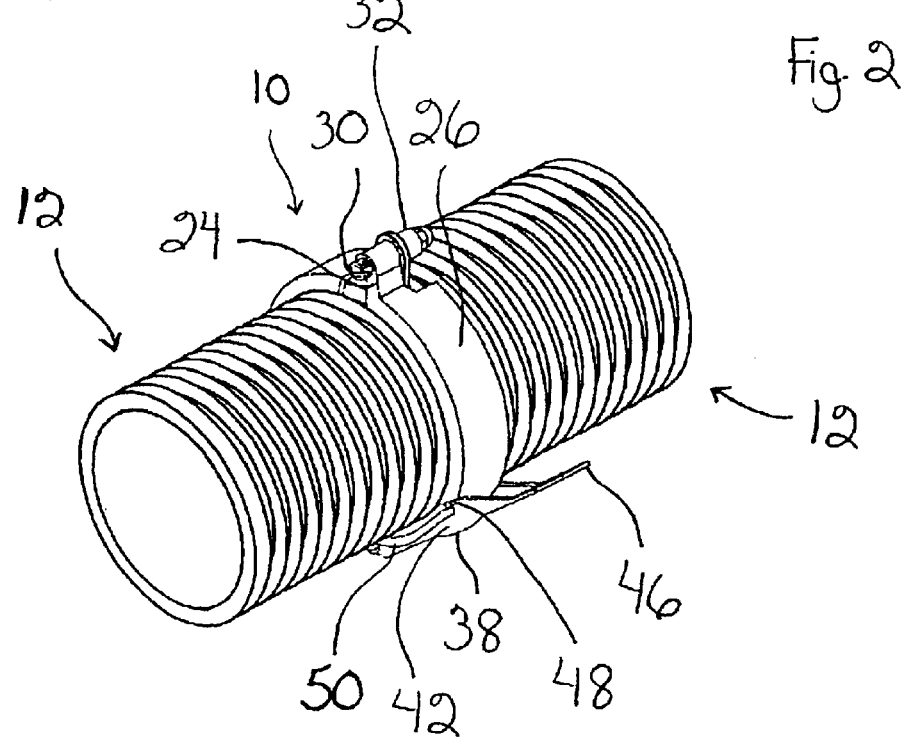

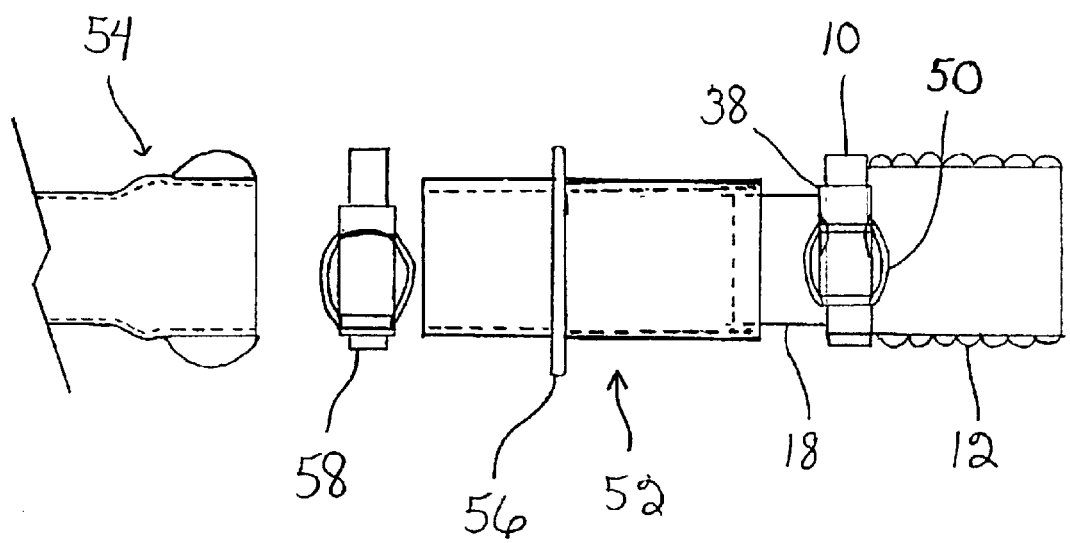

COUPLING ASSEMBLY FOR CONNECTING CORRUGATED CONDUIT

FIELD OF THE INVENTION

The present invention pertains to devices and assemblies for joining lengths of separate structural members in end to end relationship, and, more particularly, pertains to a coupling assembly for interconnecting sections or lengths of corrugated conduit in end to end disposition, or for attaching a section of conduit to an outlet, feeder, or distribution source in order to establish a continuous gas, fluid or material flow through the sections of conduit or from the source through the conduit.

BACKGROUND OF THE INVENTION

Channels, pipes and conduit of plastic, metal and steel are a ubiquitous and necessary structural element in the industrial and technological environment, and this includes both the various flexible and non-flexible types of conduit. Their applications are seemingly endless and can include: use in heating, ventilation, and air conditioning systems in homes, offices, industrial plants and in engines of all manner of public and private transportation vehicles; use in all types of plumbing and sewerage systems; use in private and public water systems and as part of the irrigation systems for private farms and large-scale commercial farms; use with equipment in industrial and environmental remediation and clean up services covering hazardous waste spills and off-shore oil spills to the removal and clean up of debris from culverts, deep well lines, elevator pits and sewer lines.

In many of the above applications, flexible, plastic, corrugated conduit is the preferred type of conduit. For example, in industrial cleaning and vacuuming services corrugated plastic conduit is preferred because of its ease and flexibility for insertion into manholes, narrow recesses and pits and its lightweight nature reduces worker strain. In addition, if necessary the corrugated plastic conduit can also be easily cut and sized for the application at hand.

While conduit comes in widely varying lengths, and plastic corrugated conduit can be cut and sized to fit the particular job, many applications may require the interconnection of individual lengths of conduit that extend in end to end registration for hundreds of feet, thousands of yards, or even miles throughout an industrial complex or underground as part of a public water or sewerage system.

Since the ends of the conduit sections are not configured for natural joining, various devices and assemblies are used to adjoin individual lengths of conduit in an end to end disposition. In applicant's experience, it is not uncommon for duct tape to be used to create an end to end joint. In addition, collars, collets, and hose clamps of varying diameters are widely available for straight conduit. For the particular application of joining corrugated conduit, couplings that snap or lock onto or in the troughs of the exterior undulating configuration of the corrugated conduit may be used.

Thus, the Kaminski et al. patent (U.S. Pat. No. 4,795,197) discloses a coupling comprised of a pair of semi-cylindrical sections hinged together for snapping around the exterior ends of two adjacent lengths of corrugated conduit. The interior surface of the coupling has undulations that mate with the exterior surfaces of the two adjacently disposed conduit lengths. However, the Kaminski coupling does not include structural features that facilitate the sealable end to end registration of adjacently disposed conduit lengths. In addition, the Kaminski coupling does not include structural features that maintain the alignment of the conduit ends while the coupling is being placed thereon. There is a great tendency for the ends of the conduit sections being joined together to slip and roll as the coupling is being placed thereon; and this problem is accentuated if the lengths of conduit cannot be properly supported and stabilized and only one individual is available to position and hold in place the ends of each conduit length while attempting to snap the coupling thereon.

SUMMARY OF THE INVENTION

The present invention comprehends a coupling for joining separate sections or lengths of conduit in end to end relationship so that fluid, gas or material can be transported therethrough, or for joining one or more sections of conduit to a media outlet, feeder or source.

The coupling of the present invention includes a cylindrical conduit joining member further defined by a pair of cylindrical half sections divided by an exterior annular flange. Each half section defines an exterior bearing surface and a bore extends through the half sections and is coequal in length therewith. The half sections are inserted into the ends of adjacently disposed sections of conduit whereupon the bearing surfaces are brought into contact with the interior surfaces of the ends of each conduit section.

Projecting from the annular flange is a web portion, and the interior ends of a pair of arcuate arms are pivotally attached to each other at the web portion. The span of the arcuate arms allows them to encompass both the ends of adjacent conduit sections and the annular flange. A latching member is pivotally mounted to the distal end of one of the arcuate arms, and when the arcuate arms are pivoted around the ends of the conduit sections, the latching member can lock the arms together thereby interconnecting the conduit sections in sealable, end to end disposition. The arms are u-shaped in cross section so that they interfit to the corrugations of the conduit sections for facilitating the adjoining of the conduit sections.

It is an objective of the present invention to provide a coupling that includes a bearing surface for facilitating the alignment of the ends of two adjacent conduit sections prior to their interconnection by the coupling.

It is another objective of the present invention to provide a coupling that is able to stabilize and support the ends of adjacent conduit sections that are locked together in end to end disposition by the coupling.

It is still another objective of the present invention to provide a coupling that can be sized to mate with the corrugations of corrugated conduit having a range of diameters.

Yet another objective of the present invention is to provide a coupling capable of interconnecting the ends of adjacent conduit sections in sealable end to end registration for preventing leakage of material from the conduit sections.

Yet still another objective of the present invention is to provide a coupling means which can be easily used to create a joint, and then equally easily taken apart.

These and other objects, features, and advantages will become apparent to those skilled in the art upon a perusal of the following detailed description of the preferred emodiment along with the accompanying drawings.

BRIEF DESCRIPTION OF THE DRAWINGS

FIG. 1 is an exploded isometric view of the coupling of the present invention showing the alignment of two corrugated conduit sections with the coupling prior to interconnection by the coupling;

FIG. 2 is an exploded isometric view of the coupling illustrating the joining of two sections of corrugated conduit by the coupling;

FIG. 5 is a side elevational view of a cylindrical adapter section that interfits to either cylindrical half section of the coupling for joining the ends of the conduit sections to the coupling.

DETAILED DESCRIPTION OF THE PREFERRED EMBODIMENT

Figure 3:
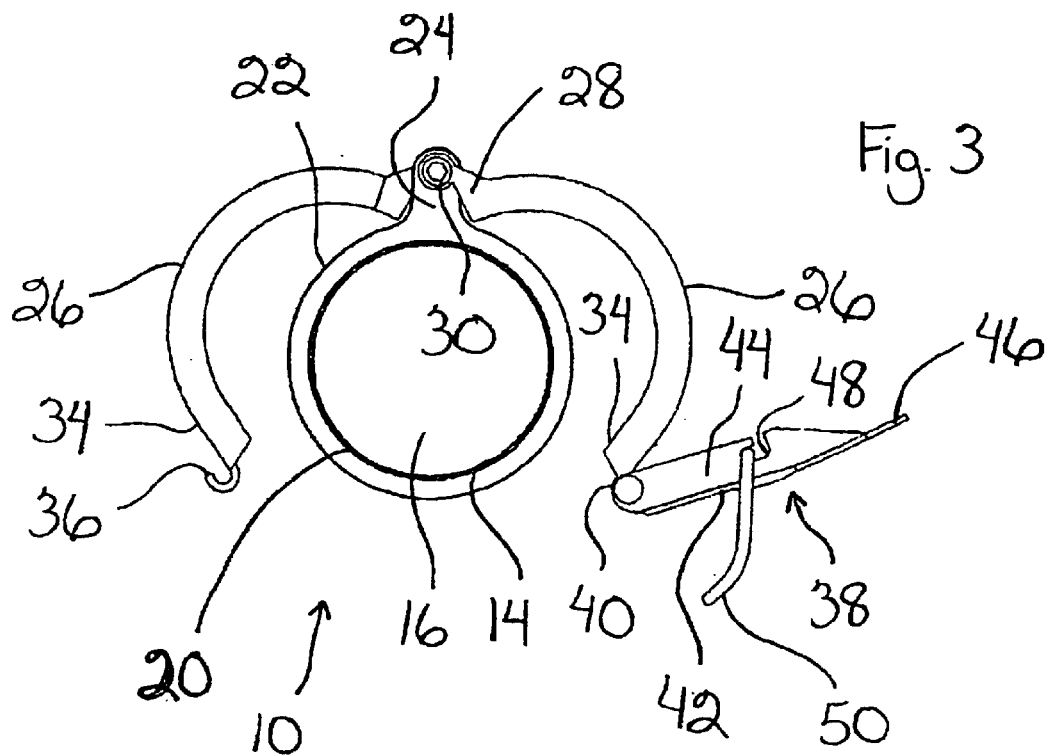
FIG. 3 is a side elevational view of the coupling illustrating the disposition of the coupling in the open, unlocked condition.

Illustrated in FIGS. 1–5 is a coupling 10 for interconnecting conduit sections, specifically corrugated conduit sections 12 as shown in FIGS. 1 and 2, or for attaching a conduit section to a piece of equipment, such as a stationary or transportable vacuum cleaner, or to a media outlet, source or feeder such as a hopper or storage bin. The coupling 10 of the present invention is easy to mount and dismount to the ends of adjacently positioned sections or lengths of conduit for locking the conduit sections together. The durability of the coupling 10 permits its use in harsh environments while its lightweight nature avoids any stress on the end of the conduit sections when the coupling 10 is locked thereon.

As shown in FIGS. 1–4, the coupling 10 includes a cylindrical conduit joining member 14 which includes a bore 16 that extends therethrough and is coequal in length with the conduit joining member 14. The conduit joining member 14 is further defined by a pair of cylindrical half sections 18 that are equal to each other in longitudinal extension. Each cylindrical half section 18 defines an exterior bearing surface 20 that facilitates the alignment of the ends of the conduit sections 12 as they are being interconnected by the coupling 10. The half sections 18 also support the ends of the adjacent conduit sections 12 after the conduit sections 12 are locked together by the coupling 10. Thus, each half section 18 is insertable within the end of one conduit section 12 for first bringing that conduit section 12 in alignment with the adjacent conduit section 12 to which it will be interconnected, and then the half sections 18 support the ends of the conduit sections 12 and maintain the alignment of the conduit sections 12.

Figure 4:
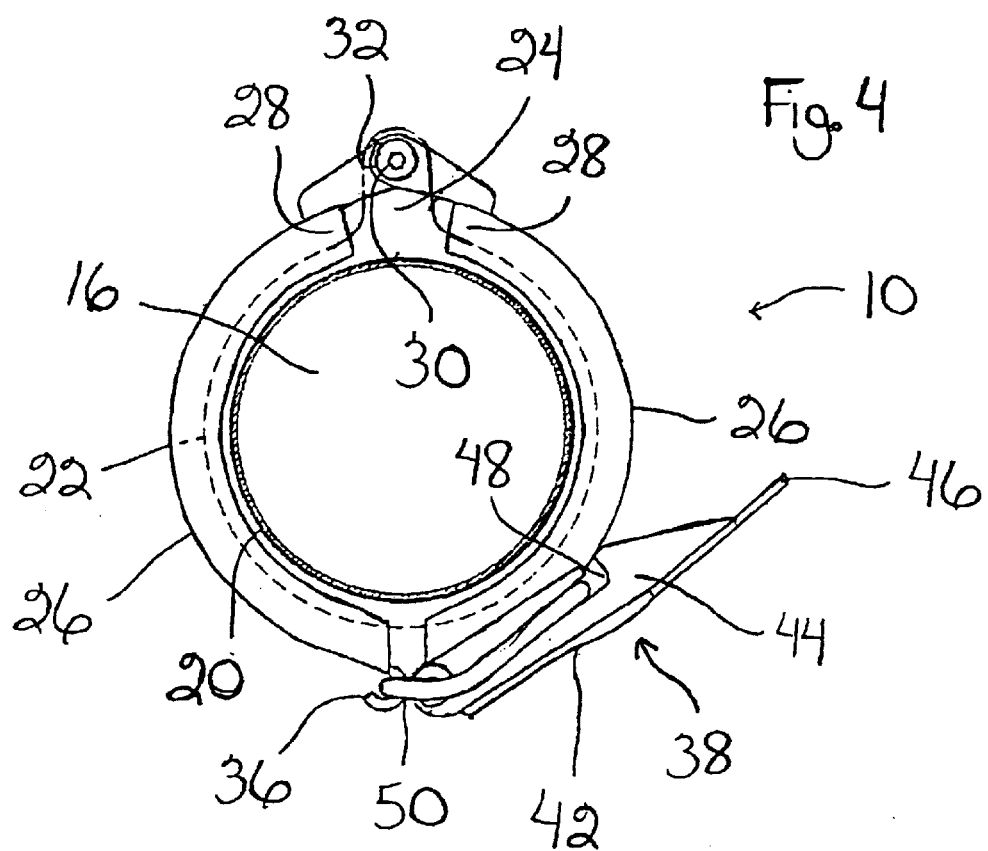
FIG. 4 is a side elevational view of the coupling illustrating the disposition of the coupling in the closed, locked condition.

As shown in FIGS. 3 and 4, an annular exterior flange 22 extends about the conduit joining member 14 essentially dividing the conduit joining member 14 into the two half sections 18. The flange 22 provides an abutment surface in so far as the ends of the opposed conduit sections 12 can be butted up against the flange 22 in order to achieve a sealable end to end registration of the conduit sections 12. In operation the coupling 10 is locked on to the ends of the adjacently positioned conduit sections 12 after the conduit section ends have been butted up against the opposed flat surfaces of the flange 22. The coupling 10 encloses both the ends of the conduit sections 12 and the flange 22 thus insuring a tight, sealed registration of the adjacently aligned conduit sections 12 thereby minimizing or preventing leakage of material from the area where the ends of the adjacent conduit sections 12 are butted against the flange 22 for interconnection by the coupling 10.

As illustrated in FIGS. 1–4, a web portion 24 projects from the annular flange 22 and is integrally formed therefrom. The web portion 24 extends laterally in the same plane as the annular flange 22 so that the web portion 24 does not interfere with the interconnection of the ends of the adjacently positioned conduit sections 12; the web portion 24 will in fact extend above the external surfaces of the conduit sections 12 as shown in FIGS. 1 and 2.

The coupling 10 includes a pair of pivotable arcuate arms 26 that encompass the flange 22 and the ends of the conduit sections 12 for locking and interconnecting the conduit sections 12. The arcuate arms 26 are pivotally mounted to the web portion 24 at their interior ends 28 by a bolt 30 and bushing 32 arrangement. The arcuate arms 26 also include distal ends 34 that swing toward each other when the coupling 10 is being locked to the ends of the adjacently positioned conduit sections 12. One of the arcuate arms 26 has a loop or catch 36 projecting from its distal end 34. Thus, FIG. 3 shows the coupling 10 in the unlocked position with the arms 26 pivoted or swung away from each other and FIG. 4 shows the coupling 10 in the locked position with the arms 26 swung toward each other and the distal ends 34 in contact for locking about the ends of the conduit sections 12. In addition, the arms 26 are u-shaped in cross section so that the arms 26 can mate with the corrugations of the corrugated conduit sections 12; more specifically, the arms 26 interfit to the troughs of the corrugated conduit 12. When the ends of the conduit sections 12 are butted against the opposite surfaces of the flange 22, the arms 26 span and fit into the troughs of the corrugations located at the end of each conduit section 12.

As shown in FIGS. 1–4, a latching member 38 is used to mechanically lock the arms 26 about the ends of the adjacently positioned conduit sections 12. The latching member 38 is pivotally mounted to the distal end 34 of one arm 26 by a pin or bolt 40 and includes a body portion 42, a pair of opposed side portions 44 that depend from the body portion 42 and a finger portion 46. Each side portion 44 has a groove or slot 48 formed thereon for receiving and holding therein a bail or locking bar 50 that is able to pivot therein from an unlocked to a locked disposition. As shown in FIGS. 3 and 4, to completely lock the arms 26 about the flange 22 and on the ends of the conduit sections 12, the arms 26 are swung about the conduit ends so that their distal ends 34 meet. The latching member 38 is then pivoted toward the other arm 26 so that the bail 50 can be hooked onto the catch 36 extending from that arm 26. The individual then presses down on the finger portion 46 of the latching member 38 thereby tightening the bail 50 on the catch 36. This action further draws the arms 26 together firmly and securely joining the arms 26 and thus locking the coupling 10 circumjacent the flange 22 and the ends of the conduit sections 12. To release the arms 26 for removing the coupling 10, the individual simply lifts up on the finger portion 46 pivoting the latching member 38 away from the arm 26 and toward the other arm 26 so that the bail 50 can be unhooked from the catch 36. Once the bail 50 is unhooked from the catch 36, both arms 26 can be swung away from the conduit sections 12 and the coupling 10 can be removed from the ends of the conduit sections 12.

Illustrated in FIG. 5 is a cylindrical adapter section 52 that can be used as an adjunct or accessory feature with the coupling 10 for facilitating the alignment of the conduit sections 12 and for supporting the conduit sections 12 when they are interconnected by the coupling 10 to, for example, a vacuum port 54. The cylindrical adapter section 52 is sized so that its inside diameter is just slightly larger than the outside diameter of the half sections 18 thereby allowing a snug, slidable fitting of the cylindrical adapter section 52 to either half section 18 of the coupling. The adapter section 52 includes an annular adapter flange 56 that is offset in its location circumjacent the body of the adapter section 52. Thus, as shown in FIG. 5, one end of the adapter section is snugly fitted on one half section 18 of the coupling 10 while the opposite end of the adapter section 52 is fitted to the end of the vacuum port 54. A regular clamp 58 encircles the flange 56 and the end of the vacuum port 54 for securing the adapter section 52 to the port 54.

The foregoing description discloses and describes a preferred embodiment for the invention, and those skilled in the art will understand that other variations modifications may be possible and practicable, and still come within the ambit of the appended claims.

I claim:

1. A coupling for joining ends of two corrugated conduit members, the conduit members each having corrugations with intermittent peaks and troughs, comprising:

a cylindrical conduit joining member having two cylindrical half sections, an exterior annular flange extending midway between the half sections, and a bore extending through the half sections;

a pair of arcuate arms pivotally mounted to the conduit joining member for selective enclosure about the conduit joining member;

a latching member pivotally secured to one of the arcuate arms for locking the arcuate arms to each other after the arms have been swung around the conduit joining member and for releasing the arms so that the arms can be disposed to an open position; and the conduit joining member and the arcuate arms being in axial alignment when the arms are enclosed about the conduit joining member and locked to each other by the latching member;

said arcuate arms being u-shaped in cross section, said cross section having a width sufficient to accommodate said exterior annular flange and at least one peak of each of the ends being joined such that an inner periphery of each of said arcuate arms lie in the trough of the corrugation forcing the ends of the two conduit members into sealed registration with said exterior annular flange so that the arcuate arms can engage and lock the two corrugated conduit members together the latching member including a body portion, a pair of opposed side portions that extend from the body portion, and a finger portion that laterally projects from the body portion.

2. The coupling of claim 1 wherein the latching member includes a locking bar pivotally mounted to the side portions and which can be pivoted for securement to the other arcuate arm after the arms have been swung around to enclose the conduit joining member and join the ends of two corrugated conduit members.

3. The coupling of claim 2 wherein the half sections of the conduit joining member define exterior bearing surfaces for supporting the ends of the two corrugated conduit members that are adjoined in end to end relationship by the coupling.

4. The coupling of claim 3 wherein at least one of the half sections can be axially extended in order to form an elongated cylindrical section capable of being inserted into the end of one corrugated conduit member thereby facilitating the alignment and securement of the corrugated conduit member to the coupling.

5. The coupling of claim 4 wherein the ends of adjacent lengths of corrugated conduit are placed on the bearing surfaces of the half sections and butted against the annular flange so that the two corrugated conduit members can be joined by the coupling in an end to end relationship.

6. The coupling of claim 5 wherein each arcuate arm includes a distal end that is pivotally secured to the conduit joining member.

7. The coupling of claim 6 further comprising a web portion that laterally extends from the annular flange in the same plane therewith for pivotally connecting the arcuate arms to the joining member.

8. A coupling device for joining corrugated conduit members in end to end relationship, each corrugated conduit member having alternating peaks and troughs, the coupling device comprising:

a cylindrical conduit joining member having a pair of cylindrical half sections delineated by an exterior annular flange and an inner bore coequal in axial extension with the half sections;

each half section of the conduit joining member capable of being inserted within the ends of adjacently positioned corrugated conduit members, each half section further including an external bearing surface for supporting the two ends of the corrugated conduit members that are mounted on to the conduit joining member in end to end relationship; and a latching mechanism pivotally mounted to the conduit joining member and capable of being swung about the ends of the adjacently positioned corrugated conduit members for locking on the ends of the corrugated conduit members and joining both corrugated conduit members in end to end relationship after the respective ends of the corrugated conduit have been aligned with and placed on the half sections of the conduit joining member, said latching mechanism including a pair of arcuate arms, said arcuate arms being u-shaped in cross section, said cross section having a width sufficient to accommodate said exterior annular flange and at least one peak of each of the ends being joined such that an inner periphery of each of said arcuate arms lie in the trough of the corrugation forcing the ends of the two conduit members into sealed registration with said exterior annular flange so that the arcuate arms can engage and lock the two corrugated conduit members together, "a latching member pivotally secured to one of said arcuate arms" said latching member including a body portion, a pair of opposed side portions that extend from said body portion, and a finger portion that laterally projects from said body portion.

9. The coupling device of claim 8 wherein the latching mechanism can be swung around the ends of adjacently positioned corrugated conduit members for locking the ends of the conduit members to each other and can be swung away from the ends of the corrugated conduit members for removing the corrugated conduit members from the coupling device.

10. The coupling device of claim 9 wherein at least one of the half sections can be axially extended thereby forming an elongated cylinder for providing a larger bearing surface in order to support and align the ends of the corrugated conduit members when placed thereon.

* * * * *